United States Patent [19]

Hehl

[11] Patent Number: 4,976,598
[45] Date of Patent: * Dec. 11, 1990

[54] INJECTION MOLDING MACHINE

[76] Inventor: Karl Hehl, Arthur-Hehl-Strasse 32, D-7298 Lossburg 1, Fed. Rep. of Germany

[*] Notice: The portion of the term of this patent subsequent to Oct. 4, 2005 has been disclaimed.

[21] Appl. No.: 331,375

[22] Filed: Mar. 31, 1989

[30] Foreign Application Priority Data

Apr. 2, 1988 [DE] Fed. Rep. of Germany ....... 3811298
Dec. 31, 1988 [DE] Fed. Rep. of Germany ....... 3844434

[51] Int. Cl.$^5$ ...................... B29C 45/76; B29C 45/17
[52] U.S. Cl. .................................. 425/135; 164/150; 164/154; 425/161; 425/163
[58] Field of Search ............... 425/135, 161, 162, 149, 425/170; 164/150, 152, 154, 157

[56] References Cited

U.S. PATENT DOCUMENTS 3,909,172  9/1975  Collins ............................... 164/154
4,775,309 10/1988  Hehl .................................. 425/135

FOREIGN PATENT DOCUMENTS 3632449  4/1988  Fed. Rep. of Germany .

OTHER PUBLICATIONS

"Arburg-Allrounder CMD", brochure, Jul. 1987, pp. 1–70.
Title page of "CIM Computer Integrated Manufacturing".
Attiyate, "Multi-Mikroprozessorsystem mit Farbmonitor", Kunststoffe-Plastics, 6/83, pp. 22–24 and translation of article (Multi-Microprocessor System with Color Monitor).
Arburg heute, 22/84, p. 5.

Primary Examiner—Jay H. Woo
Assistant Examiner—Khanh P. Nguyen
Attorney, Agent, or Firm—Spencer & Frank

[57] ABSTRACT

An injection molding machine includes a main structure formed of a pedestal including a top cover, a mold clamping unit supported on the pedestal; and an injecting unit supported on the pedestal. The injection molding machine further includes a control cabinet situated in the rear zone of the main structure; an input unit situated in an operator's control zone of the main structure. The input unit includes a data display device and an input keyboard. A cable connects the input unit with the control cabinet. To a bracket arrangement on the pedestal there is pivotally mounted a swivel arm swingable in a horizontal plane about a vertical axis. The input unit is secured to the swivel arm at a top side thereof such that the data display device is approximately at eye-level height. The input unit has, dependent upon pivotal positions of the swivel arm, a working position situated externally of the area occupied by the main structure and a position of rest within such area. The control cabinet is fixedly attached to the pedestal and has an underside which is at least approximately coplanar with the plane defined by the top cover of the pedestal.

11 Claims, 7 Drawing Sheets

INJECTION MOLDING MACHINE

BACKGROUND OF THE INVENTION

1. Field of the Invention

This invention relates to an injection molding machine comprising a machine pedestal, which has a top cover, also comprising a horizontally operable clamping unit supported by said pedestal, an injecting unit supported by said pedestal, a control cabinet, a manual control panel for direct control actions, and an input unit, which is disposed on the operator's side of the injection molding machine and is connected to the control cabinet by at least one cable and comprises a data display and an input keyboard and is movable from a position for use to a position of rest within a space that is determined by the overall dimensions of the injection molding machine, wherein the manual control panel and the input unit are within the reach of an operator assuming a predetermined working position in front of the machine.

2. Description of the Prior Art

In a known injection molding machine of that kind an input unit comprising a display screen and keyboards which are disposed laterally of said screen is suspended from a swivel arm. The control cabinet is not attached to the injection molding machine but stands beside that machine so that the control cabinet, the input unit and the injection molding machine cannot be moved in unison. In that arrangement a major portion of the control cabinet is on a level which is inconvenient for the access by a service technician. A manual control panel for direct control actions is directly mounted on the injection molding machine and can be used, e.g., for an interruption of the current program when a defect must be eliminated. When the input unit is in position for use it involves a higher accident risk because it is disposed on the eye level of the operating and assembling staff but a major part of that unit is disposed outside the field of view of such staff. For this reason a servicing of the machine will involve the risk that the protruding input unit is forgotten.

In another injection molding machine of that kind the data display device and the keyboard are spaced from the computer of the injection molding machine and that computer is accommodated in a control cabinet which is located in the lower portion of the machine. In that case the conventional unit consisting of the control cabinet, the data display device and the input keyboard is divided into separate parts so that the computer can be hermetically sealed in the control cabinet. The input unit comprising the data display device and the input keyboard is arranged separated from the injection molding machine and is merely connected by a cable to the control cabinet which too, is separated from the injection molding machine. But when the injection molding machine is to be moved (relocated or transported), a large space will be required for the control cabinet, which is arranged at the right-hand rear part of the machine. During such a handling, the control cabinet as well as the input unit has to be moved separately from the injection molding machine. (Multi-Microprozessor System mit Farbmonitor, Kunststoffe-Plastics 6/83, pages 22-24).

It is also known that the data display device, the input keyboard and the control cabinet are combined in a unit, which is disposed laterally of the injection molding machine within the reach of the operator and is separate from an additional manual control panel. Such an arrangement of the control cabinet arranged within the reach of the operator may constitute an obstruction. Furthermore, it is not feasible that the control cabinet and the main structure of the machine be moved in unison (company periodical "Arburg heute" 22/84, page 5).

SUMMARY OF THE INVENTION

It is an object of the invention so to improve the known injection molding machine of the kind described first hereinbefore that the input unit, the control cabinet and the main structure of the injection molding machine can be moved in unison while occupying only a relatively small space and that this is ensured without impairing the convenient manual control and servicing of the machine.

This object and others to become apparent as the specification progresses, are accomplished by the invention, according to which, briefly stated, the injection molding machine includes a main structure formed of a pedestal including a top cover, a mold clamping unit supported on the pedestal; and an injection unit supported on the pedestal. The injection molding machine further includes a control cabinet situated in the rear zone of the main structure; an input unit situated in an operator's control zone of the main structure. The input unit includes a data display device and an input keyboard. A cable connects the input unit with the control cabinet. To a bracket arrangement on the pedestal there is pivotally mounted a swivel arm swingable in a horizontal plane about a vertical axis. The input unit is secured to the swivel arm at a top side thereof such that the data display device is approximately at eye-level height. The input unit has, dependent upon pivotal positions of the swivel arm, a working position situated externally of the area occupied by the main structure and a position of rest within such area. The control cabinet is fixedly attached to the pedestal and has an underside which is at least approximately coplanar with the plane defined by the top cover of the pedestal.

By virtue of the above-outlined arrangement according to the invention, the main structure of the injection molding machine, the control cabinet and the input unit constitute an assembly that is movable as a unit. As a result, ments by which an injection molding machine may have to be handled throughout its useful life will greatly be facilitated. Such movements may be frequently necessary in the premises of the manufacturer of the machine as it is produced, e.g., in the conveyor line, or during transportation from the manufacturer to the customer, e.g., in containers or on trucks, or in the premises of the user, e.g., when the machine must be moved to a different location. Because the control cabinet and the input unit are arranged in empty spaces defined by the overall dimensions of the machine, the space which is required for moving the assembly as a unit is greatly be reduced. Furthermore, all components of the machine are so arranged that the center of gravity of the machine is approximately centrally disposed so that such handling movements can easily be performed. In case of need the input unit comprising the data display device and the input keyboard can be so arranged by swinging it through an appropriate angle that it can be viewed by the operator at any time. When the available space is very limited, e.g., during the transportation on a truck, the input unit and the control cabinet may be detached without complex disassembling work and stowed separately.

In case of a defect in the input unit or the control cabinet, the input unit or the control cabinet can be replaced each as a unit without complex disassembling work so that the downtime involved will be minimized. During the manufacture of the machine such units can individually be tested by an operation of a trial machine or by means of simulators so that they can subsequently be attached as operational units to the main structure of the injection molding machine even by unskilled labor to thus form the assembly that is movable as a unit. The manufacturing costs can greatly be reduced by all said measures.

The input unit, the manual control panel and the control cabinet are provided on a working level which is convenient for the manual control and for the servicing of the control means so that the control and servicing of the injection molding machine will greatly be facilitated. Also, the required cleaning operations can more easily be performed because the control cabinet and the input unit do not occupy a supporting surface on the floor. Before starting the machine operation, all data which will control the program sequence are entered by using the input keyboard. When the program has been started the input unit can be swiveled to its position of rest and the current data can then be checked at any time by a view on the display screen. The operator, during operation, can perform all special control actions (for example, modifying the program) by means of the manual control panel.

According to a preferred feature the width of the input unit is approximately as large as the width of the display screen of the data display device. In that case the input unit even in position for use will occupy only a small space so that the freedom of movement of the operator in front of the injection molding machine will hardly be restricted.

In accordance with a preferred feature the swivelling input unit extends vertically above the top cover of the machine pedestal and is supported by a bracket on the front longitudinal wall of the machine pedestal at that end thereof which is adjacent to the injecting unit, and the swivelling input unit is carried by a swivel arm, which by a hinge pin that is disposed over the top cover of the machine pedestal is connected to the bracket, which is vertically spaced from the top cover of the machine pedestal. In that case the access to the motor and to the tank space of the injection molding machine will be facilitated because when the injecting unit has been removed the top cover of the machine pedestal can be removed without a need for other disassembling work.

In accordance with a further preferred feature, the swivelling input unit and the swivel arm, by which said input unit is indirectly supported throughout its width, are vertically separated from each other by a space which includes a space that has the same width as the display screen. Furthermore, the free space which is provided between the input unit and the swivel arm may be used to accommodate sorting pockets or electronic components.

DETAILED DESCRIPTION OF THE PREFERRED EMBODIMENT

Figure 1:
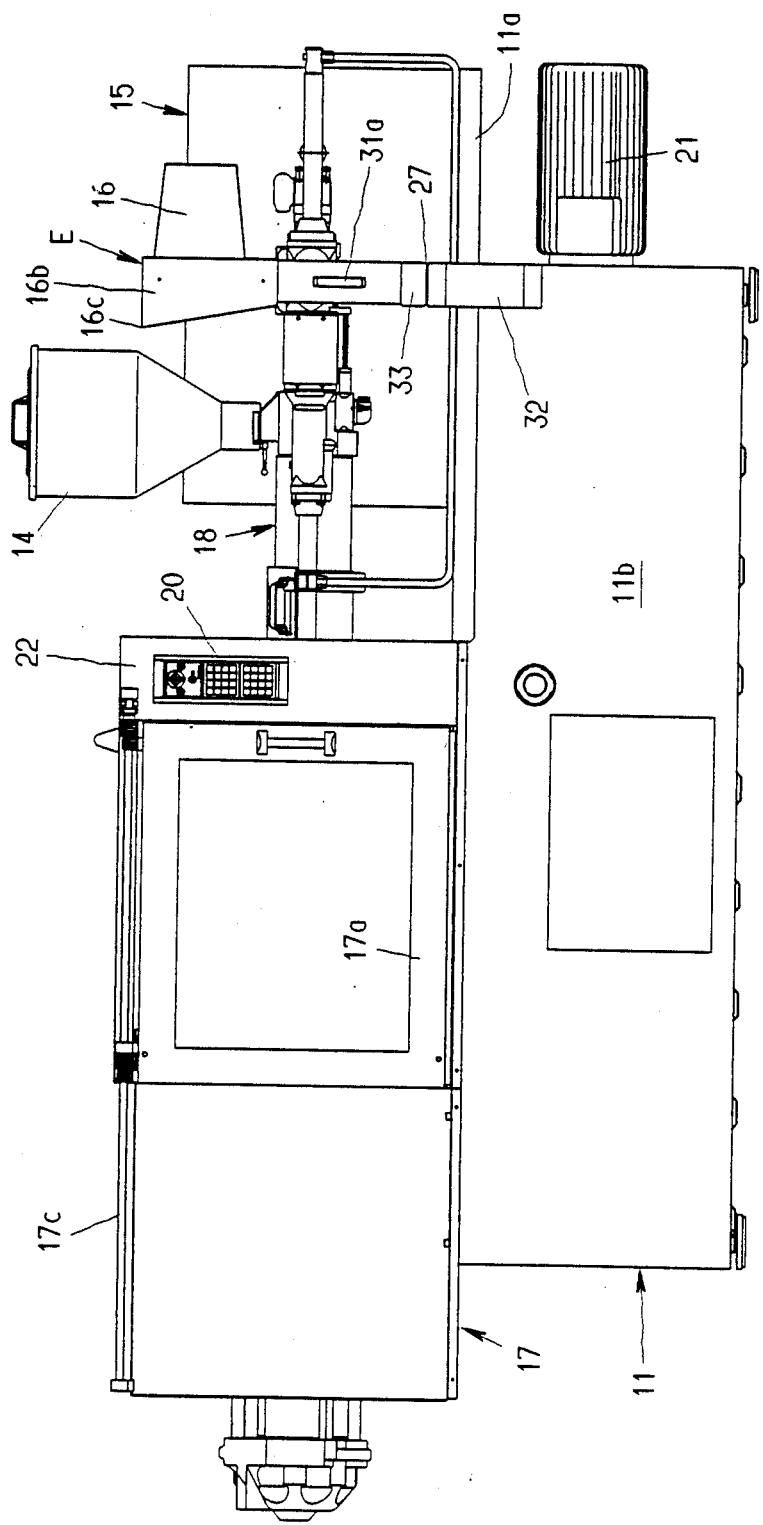
FIGS. 1 and 2 are front elevations showing the injection molding machine with the input unit in position for use and in position of rest, respectively.
Figure 2:
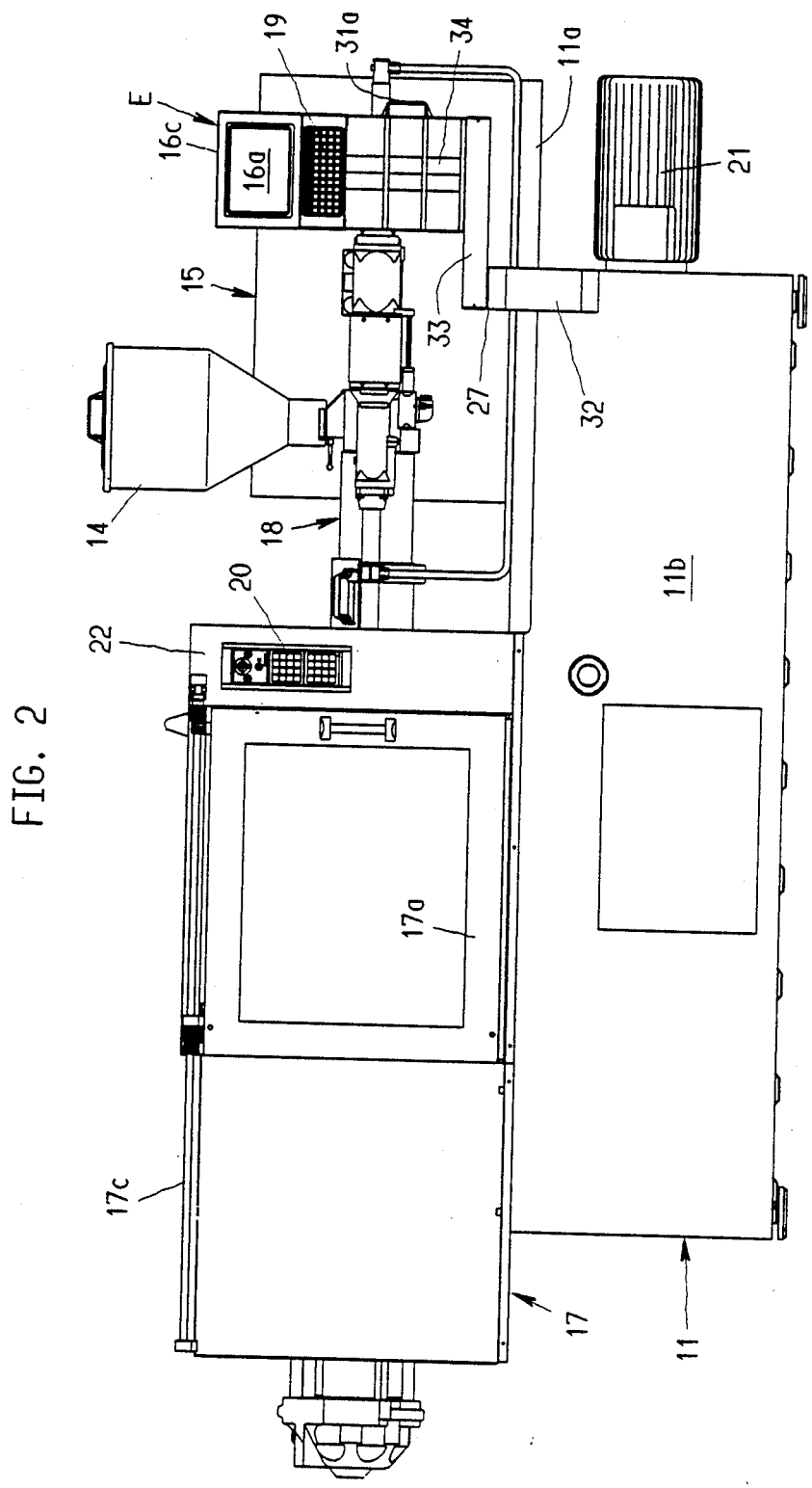
Figure 3:
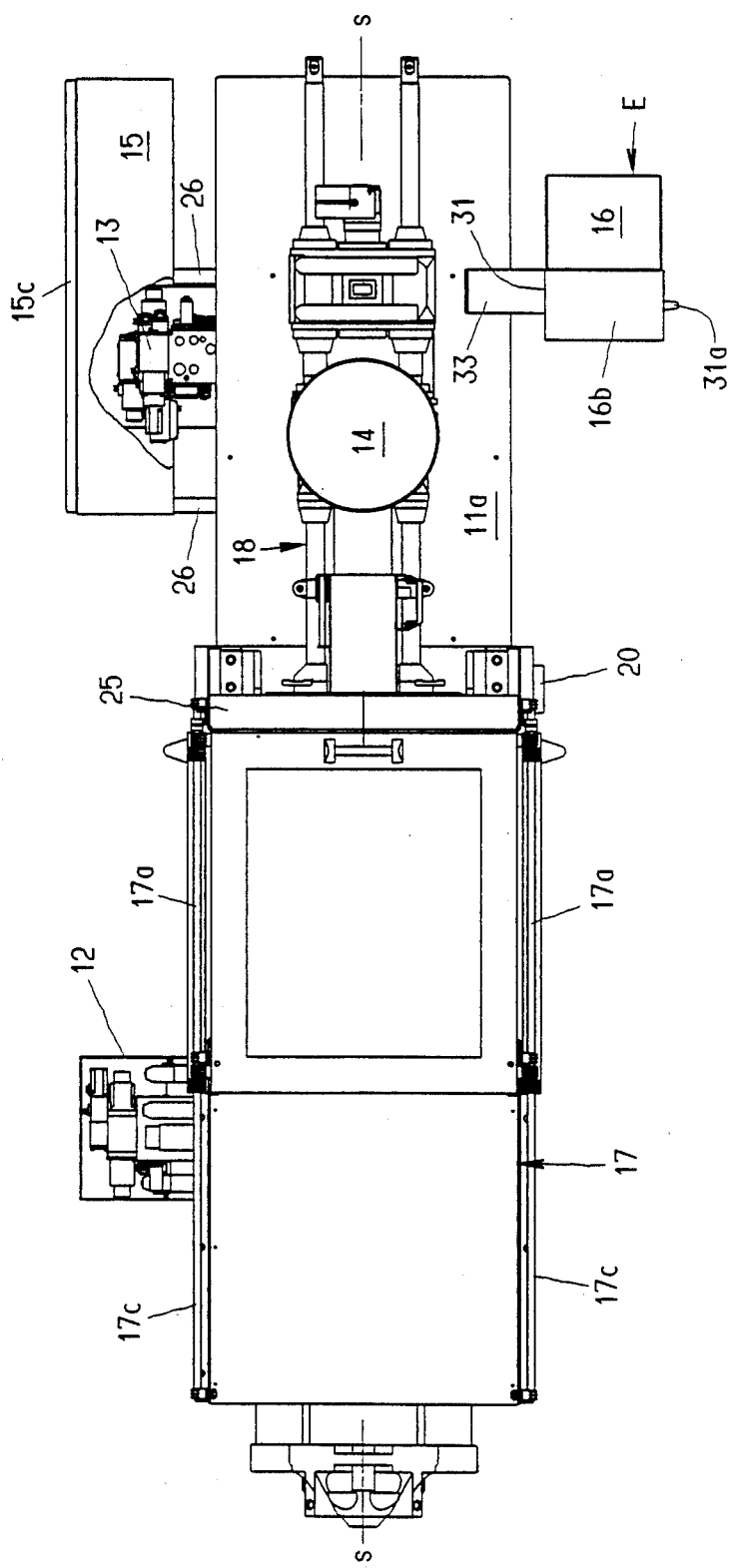
FIGS. 3 and 4 are top plan views showing the machine of FIGS. 1 and 2 with the input unit in position for use and in position of rest, respectively.

An illustrative embodiment of the invention will now be described more in detail with reference to the drawing.

Figure 4:
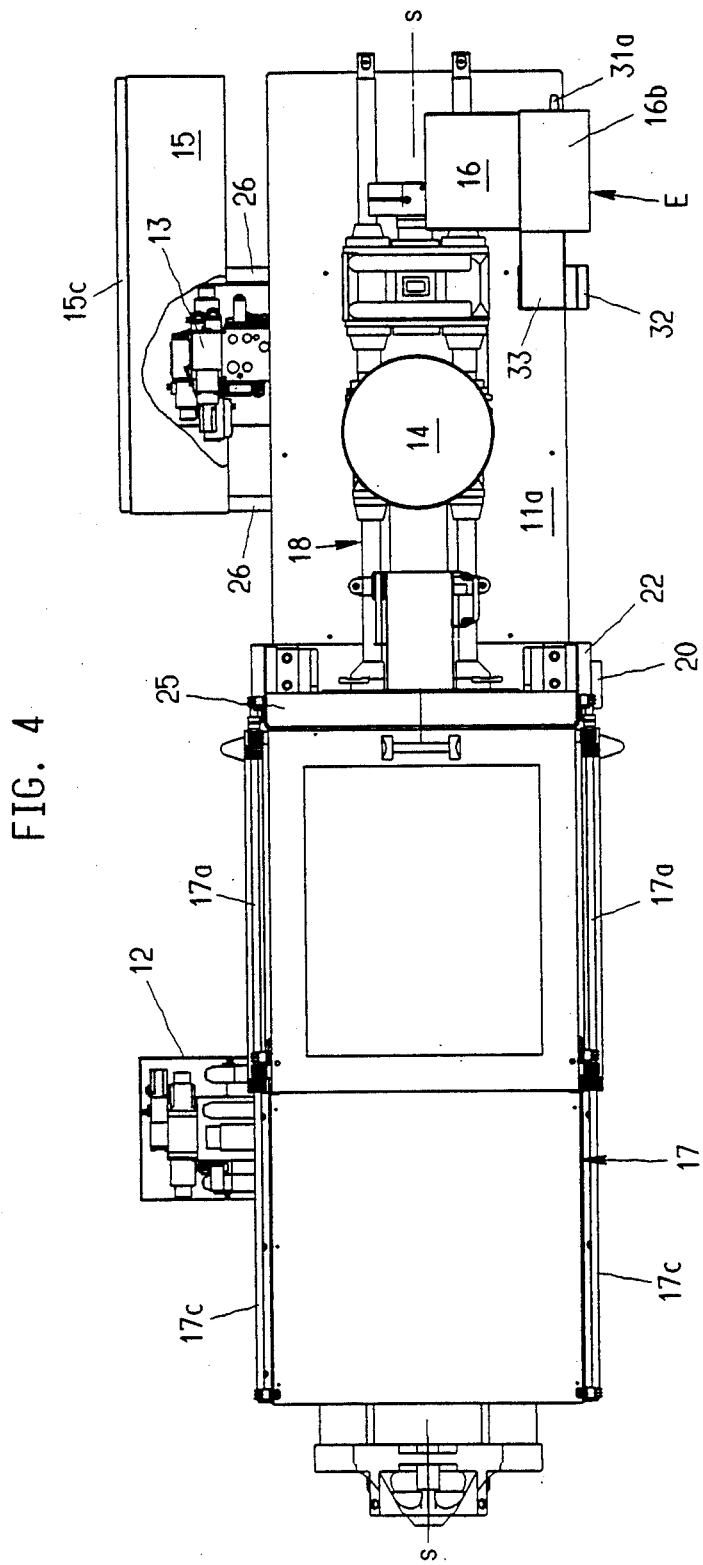
Figure 5:
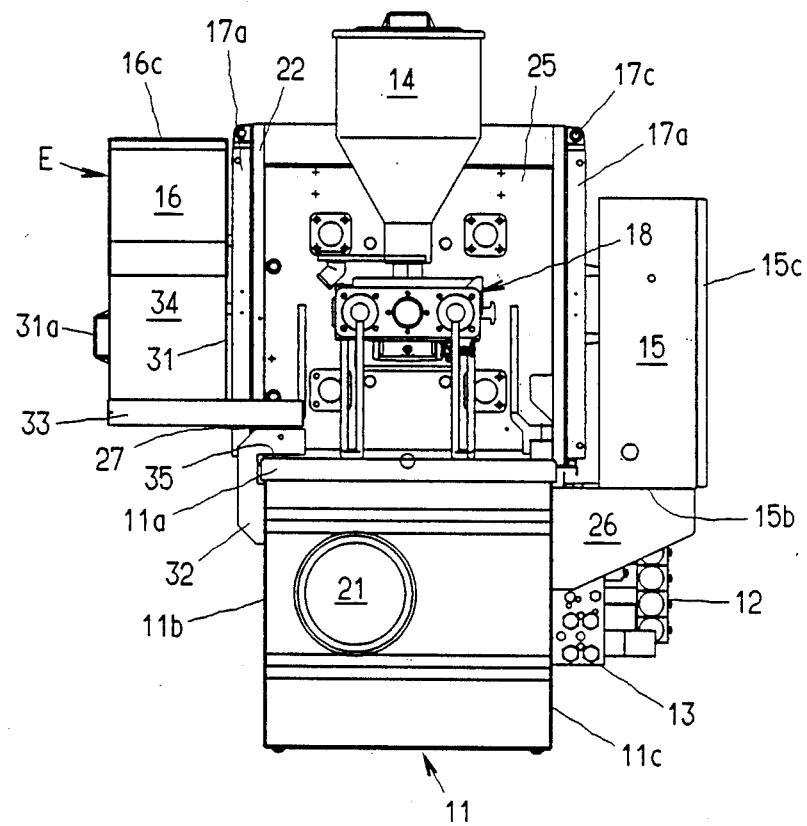
FIGS. 5 and 6 are end views on that end on which the injecting unit is disposed and show the machine of FIGS. 1 and 2 with the input unit in position for use and in position of rest, respectively.
Figure 6:
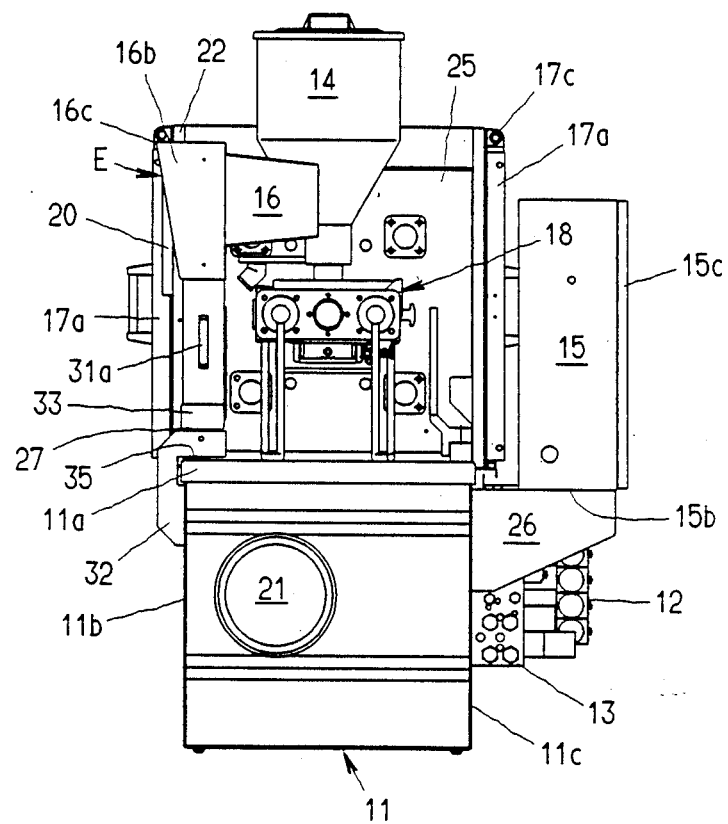
Figure 7:
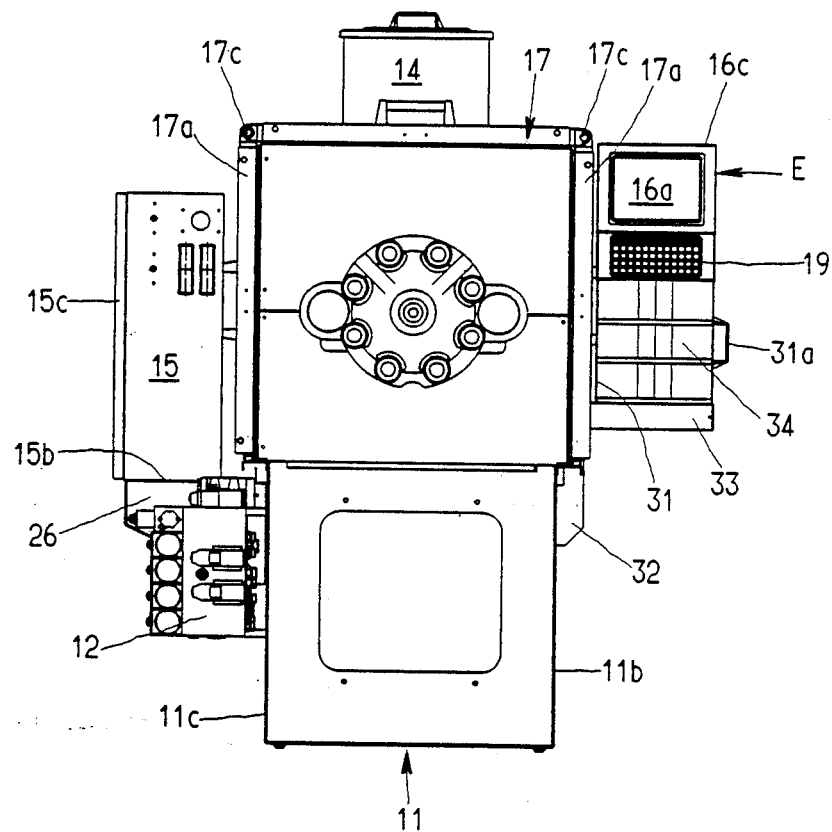
FIG. 7 is an end view on that end at which the clamping unit is disposed and shows the machine with the input unit in position for use.

The injection molding machine comprises a parallelepipedic machine pedestal 11, which is made of sheet steel and on which a horizontally operable clamping unit 17 and an injecting unit 18 are supported. A parallelepipedic control cabinet 15 is attached to the machine pedestal on the rear of the latter. The computer of the injection molding machine is accommodated in the control cabinet and is connected by at least one cable to an input unit E, which comprises a data display device 16 and an input keyboard 19. That input unit in position for use is disposed within the reach of an operator assuming a predetermined working position in front of the machine. The swivelling input unit is movable from its position for use to a position of rest. The control cabinet 15 and the swivelling input unit E, when it is in position of rest, are substantially accommodated in an empty space which is defined by the overall dimensions of the main structure of the injection molding machine. As a result, existing empty spaces are utilized to accommodate the control cabinet 15 and the input unit E. The data display device 16 and the input keyboard 19, which is disposed under the data display device, are disposed on the eye level of an operator assuming that working position. The display screen 16a of the data display device 16 is protected by an antiglare screen 16b from light which is incident from above. A handle 31a which is attached to the input unit E can be used to move the input unit between its position of rest and its position for use. The width of the input unit E is approximately as large as the width of the display screen 16a of the data display device 16. When the input unit E is in position of rest, its input keyboard 19 is parallel to a manual control panel 20 for direct control actions. As is apparent from FIG. 4, the input keyboard 19 and the data display device 16 will be parallel to the vertical longitudinal plane of symmetry S—S of the injecting unit 18 when the input unit is in position of rest. The manual control panel 20 is also parallel to the plane S—S.

In that position of rest the top edge 16c of the antiglare screen 16b that is associated with the display screen 16a of the data display device 16 is approximately flush with the vertical plane which is defined by the sliding guard doors 17a, which are disposed on the front side of the clamping unit 17. The guard doors 17a are guided by track rails 17c.

As is apparent from FIGS. 1, 3, 5 and 7 the input unit E is pivoted on a vertical axis and when in position for use extends at right angles to the vertical longitudinal plane of symmetry S—S of the injecting unit 18. As is particularly apparent from FIGS. 5 and 7 that end face 31 of the swivelling input unit E which faces the injecting unit when the input unit is in position for use lies approximately in the vertical plane that is defined by the sliding guard doors 17a on the front side of the clamping unit 17. Granular plastic material is supplied to the injecting unit 18 by a hopper 14. As is apparent from FIG. 1 in conjunction with FIG. 5 the vertical swivelling input unit E is disposed over the top cover 11a and is supported by means of a bracket 32 on the front longitudinal side wall 11b of the machine pedestal 11. The swivelling input unit E is carried by a swivel arm 33, which is hinged to the bracket 32 by a hinge 27, which is disposed over the top cover 11a of the machine pedestal 11. In case of need, e.g., for a transportation in a confined space on a truck, the input unit can be detected from the main structure of the injection molding machine. The input unit E and the swivel arm 33, which indirectly supports the input unit throughout its width, are vertically spaced apart by a space which contains a space that has the same width as the display screen 16a and may be used to accommodate, e.g., sorting pockets 34 or electronic components.

The control cabinet 15 is disposed over the hydraulic distributor blocks 12, 13 and is secured by means of two brackets 26 to the rear longitudinal side wall 11c of the machine pedestal. The bottom surface 15b of the control cabinet lies approximately on the level of the top cover 11a of the machine pedestal 11. The interior of the control cabinet is accessible from the rear through doors 15c, which are provided on a level which is convenient for a servicing technician. The control cabinet 15 is horizontally spaced from the vertical plane that is defined by the rear longitudinal side wall 11c of the machine pedestal 11.

The major dimension of the control cabinet 15 is parallel to the vertical longitudinal plane of symmetry S—S of the injection unit 18 and is substantially disposed within that overall dimension of the injection molding machine which is defined by the hydraulic distributor blocks 12, 13. At one end of the injection molding machine, the top cover 11a of the machine pedestal 11, the control cabinet 15 and the motor 21 of the injection molding machine terminate in a common transverse vertical plane. The manual control panel 20 is mounted on a keyboard holder 22 and because it is centrally disposed it permits the manual control actions to be performed by the operator as soon as trouble has arisen in the operation of the machine. Next to the keyboard holder and the stationary mold carrier 25, the sliding guard doors 17a of the clamping unit 17 are disposed when said doors are closed. In case of a defect in the control cabinet 15 or the input unit E, the control cabinet or the input unit may individually be replaced at any time. Because the parts 15 and E are prefabricated, they may be replaced even by unskilled labor.

The control cabinet 15, the input unit E and the main structure of the injection molding machine constitute a unit. The swivel arm 33 which carries the input unit E is connected to the bracket 32 by a hinge, which comprises a hinge pin 27. The centrally disposed manual control panel 20 is mounted on the stationary mold carrier. The control cabinet 15 is attached to the main structure of the machine on the rear thereof and is arranged on a level which is convenient for a service technician.

The bracket 32 defines a clearance 35 with top cover 11a of the machine pedestal 11. Owing to that clearance 35 the input unit E need not be removed to permit a pulling of the top cover 11a beyond the injecting unit 18. When the top cover 11a of the machine pedestal 11 has been removed, those parts of the machine which are disposed within the machine pedestal will readily be accessible.

What is claimed is:
1. In an injection molding machine including
   a main structure having an area outlined by overall dimensions as viewed in a vertical projection, a rear zone, a front zone and a lateral, operator's control zone; said main structure including
   a pedestal including a top cover defining a plane;
   a horizontally operable mold clamping unit supported on said pedestal;
   an injecting unit supported on said pedestal and having a vertical longitudinal plane of symmetry;
   a control cabinet situated in said rear zone and having an underside;
   an input unit situated in said operator's control zone; said input unit including a data display device and an input keyboard;
   a cable connecting said input unit with said control cabinet;
   the improvement comprising
      post means supported on said pedestal and defining a vertical pivot axis;
      a swivel arm mounted on said post means and swingable in a horizontal plane about said vertical pivot axis; said swivel arm being situated closely above said top cover of said pedestal; said input unit being secured to said swivel arm and being situated thereabove such that said data display device is approximately at eye-level height; said input unit having, dependent upon pivotal positions of the swivel arm, a working position situated externally of said area of the main structure and a position of rest within said area; and
      connecting means for fixedly attaching said control cabinet to said pedestal; said underside of said control cabinet being at least approximately coplanar with the plane defined by said top cover.

2. An injection molding machine as defined in claim 1, wherein said pedestal has an outline as viewed in a vertical projection; said data display device being situated externally of the outline of said pedestal in said working position and in said position of rest.

3. An injection molding machine as defined in claim 1, wherein said input unit has a width and said data display device has a width approximately equal to the width of the input unit.

4. An injection molding machine as defined in claim 1, wherein said injection molding machine further includes a stationary mold carrier and a manual control panel situated in said operator's control zone adjacent said stationary mold carrier; said injecting unit having a symmetry plane; said input keyboard, when said input unit is in said position of rest, extends parallel to the manual control panel; and further wherein said manual control panel and said input unit extend, when the input unit is in the position of rest, parallel to the symmetry plane of the injecting unit.

5. An injection molding machine as defined in claim 4, wherein said data display device has an antiglare screen including a top edge; said mold clamping unit having sliding guard doors situated in the operator's control zone and lying in a vertical plane; said top edge, when the input unit is in said position of rest, approximately lies in said vertical plane defined by said sliding guard doors.

6. An injection molding machine as defined in claim 1, said injecting unit having a vertical longitudinal symmetry plane; said input unit having an end face oriented towards the injecting unit; said mold clamping unit having sliding guard doors situated in the operator's control zone and lying in a vertical plane; said input unit, when in said working position, being oriented perpendicularly to said symmetry plane and said end face of said input unit lying approximately in said vertical plane defined by said sliding guide doors.

7. An injection molding machine as defined in claim 1, wherein said pedestal has a longitudinal side wall in said operator's control zone; further wherein said post means comprises a bracket supported at an end of said longitudinal side wall and a pivot pin defining said vertical pivot axis and being affixed to said bracket.

8. An injection molding machine as defined in claim 1, wherein said input unit and said swivel arm are vertically spaced from one another.

9. An injection molding machine as defined in claim 1, wherein said pedestal has a rear longitudinal side wall and said main structure includes hydraulic distributor blocks disposed at an end of said rear longitudinal side wall; said hydraulic distributor blocks defining one of said overall dimensions; wherein said connecting means comprises two brackets securing said control cabinet to said pedestal above said hydraulic distributor blocks; said control cabinet being laterally spaced from said rear longitudinal side wall of said pedestal and extending parallel to said vertical longitudinal plane of symmetry of said injecting unit.

10. An injection molding machine as defined in claim 9, wherein said control cabinet slightly projects beyond said one overall dimension defined by said hydraulic distributor blocks.

11. An injection molding machine as defined in claim 1, wherein said top cover of said pedestal and said control cabinet terminate in a common vertical plane defining a rear terminus of the injection molding machine and being oriented perpendicularly to said vertical longitudinal plane of symmetry of said injecting unit.

* * * * *